United States Patent
Kimura

(12) 
(10) Patent No.: US 10,663,329 B2
(45) Date of Patent: *May 26, 2020

(54) ELECTROPOTENTIAL DETECTION ELECTRODE OF ELECTROMAGNETIC FLOW METER

(71) Applicant: Azbil Corporation, Tokyo (JP)

(72) Inventor: Koji Kimura, Tokyo (JP)

(73) Assignee: Azbil Corporation, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 16/219,265

(22) Filed: Dec. 13, 2018

(65) Prior Publication Data

US 2019/0186965 A1 Jun. 20, 2019

(30) Foreign Application Priority Data

Dec. 15, 2017 (JP) .................................. 2017-240986

(51) Int. Cl.
| | |
|---|---|
| *G01F 1/58* | (2006.01) |
| *G01F 23/24* | (2006.01) |
| *G01N 27/06* | (2006.01) |

(52) U.S. Cl.
CPC .............. *G01F 1/588* (2013.01); *G01F 1/584* (2013.01); *G01F 23/24* (2013.01); *G01N 27/06* (2013.01)

(58) Field of Classification Search
CPC .................................... G01F 1/58; G01F 23/24
See application file for complete search history.

(56) References Cited

U.S. PATENT DOCUMENTS

2019/0186966 A1* 6/2019 Kimura ................... G01F 1/584

FOREIGN PATENT DOCUMENTS

| JP | H02-16024 U | 2/1990 |
|---|---|---|
| JP | H08-271302 A | 10/1996 |
| JP | 2018-146274 A | 9/2018 |

OTHER PUBLICATIONS

Korean Intellectual Property Office, "Notification of Reason for Refusal," issued in Korean Patent Application No. 10-2018-0160781, which is a counterpart to U.S. Appl. No. 16/219,265, dated Oct. 11, 2019, 6 pages (3 pages of English Translation of Office Action and 3 pages of Original Office Action).

* cited by examiner

*Primary Examiner* — Jewel V Dowtin
(74) *Attorney, Agent, or Firm* — Amster, Rothstein & Ebenstein LLP

(57) ABSTRACT

A main body portion including at one end thereof a liquid-contact portion exposed into a measurement tube and being electrically conductive from the one end to the other end is provided. A terminal portion including a disc shaped portion (contact portion) that is separably in contact with the other end of the main body portion is provided. A connecting portion configured to connect a pulling tool to the main body portion is provided.

4 Claims, 6 Drawing Sheets

ELECTROPOTENTIAL DETECTION ELECTRODE OF ELECTROMAGNETIC FLOW METER

CROSS-REFERENCE TO RELATED APPLICATION

The present application claims the benefit of and priority to Japanese Patent Application No. 2017-240986, filed on Dec. 15, 2017, the entire contents of which are incorporated by reference herein.

TECHNICAL FIELD

The present invention relates to an electropotential detection electrode of an electromagnetic flow meter, which has a main body portion comprising a liquid-contact portion and a terminal portion formed separately.

BACKGROUND

Some electromagnetic flow meters of the related art are configured to extract an electromotive force generated in a fluid flowing in a measurement tube by using an electropotential detection electrode. The electropotential detection electrode, typically made of a stainless steel, is made of various materials depending on corrosiveness of detection targets. Examples of electrode materials having high corrosive resistance include precious metal materials such as platinum as disclosed, for example, in PTL 1 in many cases. The precious metal materials have such a disadvantage as having difficulty to achieve desired shapes depending on the shape due to their low strength. In order to solve the disadvantage described above, forming an electrode by using a non-precious metal material as a base metal and covering the electrode with a precious metal material is conceivable as described in PTL 1.

However, when an abrasive substance is included in the fluid flowing in the measurement tube, the precious metal material covering the electrode may be peeled off. In addition, the precious metal material covering the electrode may be peeled off due to an impact applied to the measurement tube, corrosion of the measurement tube, or a defect at the time of manufacture.

When the precious metal material is peeled off, an electrochemical noise is generated due to an electropotential difference between the base metal and the precious metal material. This noise corresponds to an output noise from the electromagnetic flow meter.

The problem of generation of the noise due to peeling off of the metal material that covers the electrode may be solved by making an electrode body with an insulating material, covering a surface of the insulating material with a precious metal material, and using the precious metal material as a conduction path as proposed by an applicant of the present application in PTL 2. Described in PTL 2 is an electropotential detection electrode 3 having such structure that a base material 1 made of a ceramic, which is an insulating material, is covered with a conductor 2 made of a metal having corrosive resistance as illustrated in FIG. 9. The electropotential detection electrode 3 includes a first small diameter portion 3a to be inserted into a hole 5 formed in a measurement tube 4 for inserting an electrode, a large diameter portion 3b located outside the measurement tube 4, and a second small diameter portion 3c projecting from the large diameter portion 3b in a direction opposite from the first small diameter portion 3a. A lead wire 6 is connected to the second small diameter portion 3c.

The second small diameter portion 3c has a function as a terminal for connecting the lead wire 6 and a function as a grip that an operator holds with fingers for attaching and removing the electropotential detection electrode 3 with respect to the measurement tube 4. Therefore, the electropotential detection electrode 3 of the related art requires that a terminal portion 8 including the second small diameter portion 3c is coupled to a main body portion 7 (see FIG. 9) including the first small diameter portion 3a and the large diameter portion 3b.

However, for configuring the electropotential detection electrode 3 like the electrode described in PTL 2, if a ceramic is employed as an insulating material of the base material 1, the terminal portion 8 and the main body portion 7 are preferably formed separately. It is because of such advantages that forming the main body portion 7 and the terminal portion 8 separately improves a strength of these members and reduces difficulty in manufacture, and a surface area to be applied with a material for conductor 2 is reduced. In order to form the main body portion 7 and the terminal portion 8 separately in this manner, a coupling structure for coupling the main body portion 7 and the terminal portion 8 is required.

Conceivable coupling structures include, for example, press-fitting, fastening with an insert screw, brazing, and adhesion. When the base material 1 is made of a brittle material, such as alumina, the coupling structure cannot be achieved with the insert screw or brazing because the press-fitting may cause breakage, and the adhesion cannot achieve electric conduction.

In order to insert the insert screw into the main body portion 7 of the electropotential detection electrode 3, configurations as illustrated in FIG. 10 and FIG. 11 are conceivable. In FIG. 10 and FIG. 11, the same or similar members as or to the members described with reference to FIG. 9 will be denoted by the same reference signs and detailed description will be omitted as appropriate.

An electropotential detection electrode 11 illustrated in FIG. 10 and FIG. 11 includes the main body portion 7 formed by covering the base material 1 made of a ceramic with a conductor and the terminal portion 8 attached to the main body portion 7 via a coupling structure 12. The coupling structure 12 includes an insert screw 13 including a female screw member embedded in the main body portion 7 and a male screw 14 of the terminal portion 8 screwed into the insert screw 13.

The insert screw 13 illustrated in FIG. 10 is provided inside the large diameter portion 3b of the main body portion 7. Therefore, the large diameter portion 3b is formed to have a thickness that can store the insert screw 13.

The insert screw 13 illustrated in FIG. 11 is disposed through the large diameter portion 3b and a distal end portion enters into the first small diameter portion 3a. Therefore, the large diameter portion 3b is formed to have a smaller thickness compared with the large diameter portion 3b illustrated in FIG. 10, and the first small diameter portion 3a is formed to have a relatively larger outer diameter.

CITATION LIST

Patent Literature

[PTL 1] JP-UM-A-2-16024
[PTL 2] Japanese Patent Application No. 2017-038984

SUMMARY

In order to insert the insert screw 13 into the large diameter portion 3b of the main body portion 7 as illustrated in FIG. 10, the thickness of the large diameter portion 3b needs to be larger than normal, and thus the main body portion 7 upsizes in a longitudinal direction correspondingly. Such a problem may be solved to some extent by embedding the insert screw 13 to reach not only the large diameter portion 3b, but also the first small diameter portion 3a, as illustrated in FIG. 11. However, this makes the first small diameter portion 3a thick and thus the measurement tube 4 that can be used is subjected to the restrictions. In other words, as illustrated in FIG. 11, this configuration may be applied to the measurement tube 4a having a relatively large diameter, but not to the measurement tube 4b having a relatively small diameter.

In contrast, when the terminal portion is brazed to the main body portion 7, the measurement tube 4 that can be used is not subjected to the restrictions, but a problem may occur due to exposure to a high temperature when the conductor 2 is sintered. When brazing is performed before sintering the conductor 2, a brazed portion may easily become damaged due to heat during the sintering, Therefore, in such a case, a material that resists sintering needs to be selected as a material for brazing. In contrast, when sintering is performed after brazing, sintering needs to be performed without breaking the brazed portion. Therefore, sintering needs to be performed in a special atmospheric furnace. These methods generally increase costs.

Therefore, in order to solve the above-described problem caused by coupling the terminal portion 8 to the main body portion 7, an electropotential detection electrode of an electromagnetic flow meter, which is configured to be capable of removing the main body portion 7 from the measurement tube 4 without using the terminal portion 8 coupled to the main body portion 7, is required.

It is an object of the present invention to provide an electropotential detection electrode of an electromagnetic flow meter, which does not need to use a terminal portion to remove a main body portion from a measurement tube.

In order to achieve the above-described object, there is provided an electropotential detection electrode of an electromagnetic flow meter according to the present invention comprising: a main body portion provided at one end thereof with a liquid-contact portion exposed into a measurement tube of the electromagnetic flow meter and being electrically conductive from the one end to the other end; a terminal portion comprising a contact portion that is separably in contact with the other end of the main body portion and electrically connected to the other end of the main body portion via the contact portion corning into contact with the other end, and the connecting portion configured to connect a pulling tool to the main body portion.

In the electropotential detection electrode of an electromagnetic flow meter according to the present invention, the main body portion may comprise a small diameter portion having a cylindrical shape and serving at one end thereof as the liquid-contact portion by being inserted into an electrode insertion hole of the measurement tube, and a large diameter portion having a disc shape, being connected at one end thereof to the other end of the small diameter portion, extending outward from the small diameter portion in a radial direction, and coming into contact at the other end thereof with the terminal portion, and the connecting portion may comprise a cylindrical portion configured to accommodate the large diameter portion inserted therein, an engaging portion provided on the cylindrical portion at an opposite end from the terminal portion and configured to engage the large diameter portion, and a pulling tool attachment provided on the cylindrical portion.

In the electropotential detection electrode of an electromagnetic flow meter according to the present invention, the engaging portion may be formed into a cylindrical shape surrounding the large diameter portion, and the large diameter portion may be provided with an annular recessed portion on an outer peripheral portion thereof and configured to define an annular groove in cooperation with the engaging portion.

In the electropotential detection electrode of an electromagnetic flow meter of the present invention, the connecting portion may comprise a first hole opening at the other end of the main body portion and a second hole opening through a hole wall surface of the first hole.

In the present invention, the main body portion can be disconnected from the measurement tube by connecting the pulling tool to the main body portion via the connecting portion in a state in which the terminal portion is removed from the main body portion and pulling the pulling tool. Therefore, according to the present invention, an electropotential detection electrode of an electromagnetic flow meter eliminates the need for usage of the terminal portion When removing the main body portion from the measurement tube.

DETAILED DESCRIPTION

First Embodiment

Figure 1:
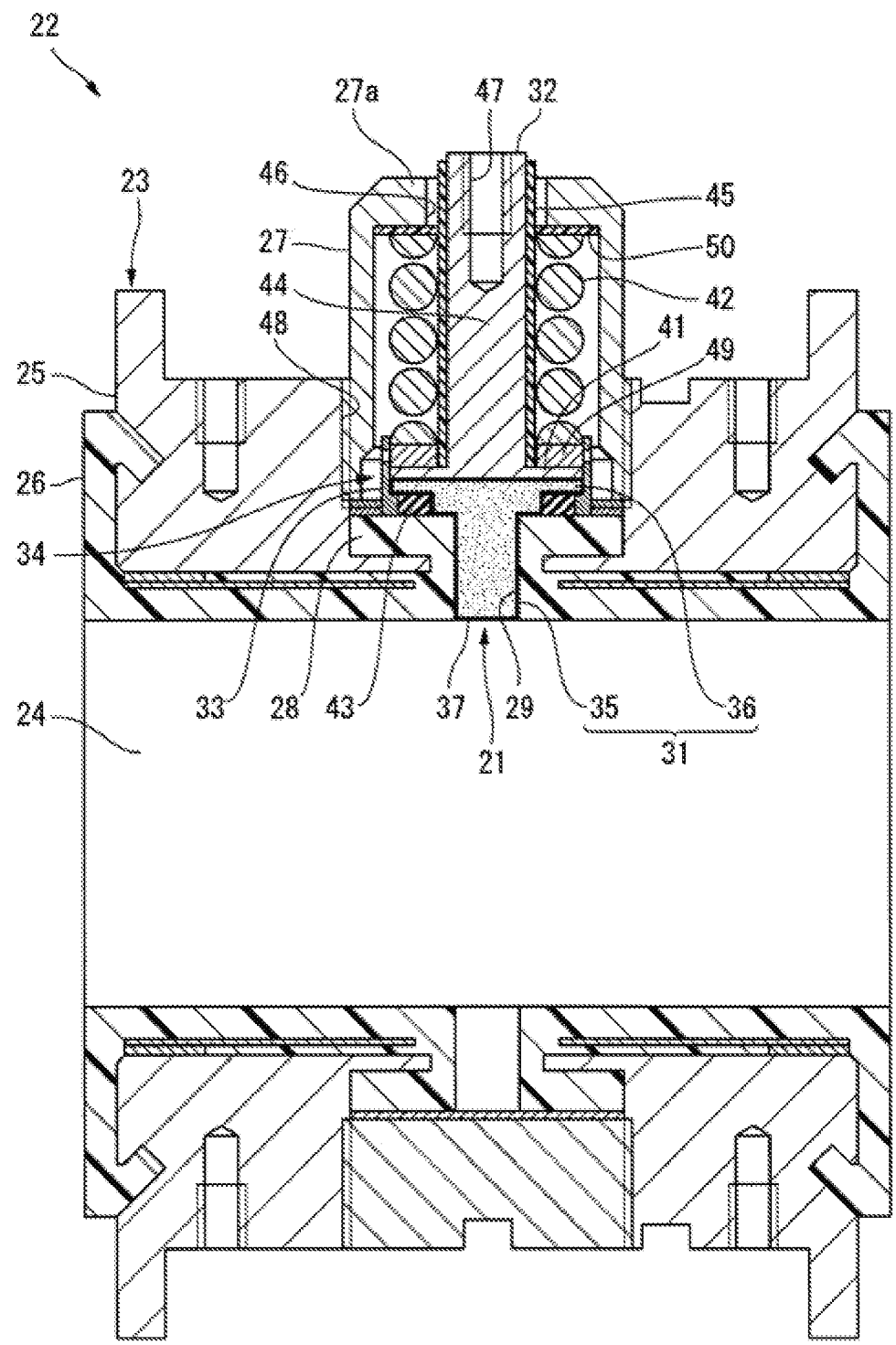
FIG. 1 is a cross-sectional view of an electromagnetic flow meter provided with an electropotential detection electrode according to the present invention.

Referring now to FIG. 1 to FIG. 6, an embodiment of an electropotential detection electrode of an electromagnetic flow meter according to the present invention will be described in detail below.

An electropotential detection electrode 21 illustrated in FIG. 1 (hereinafter, referred to simply as an electrode 21) is attached to a measurement tube 23 of an electromagnetic flow meter 22 from outside a fluid path 24.

The measurement tube 23 comprises a main body 25, a lining 26 provided on an inner surface of the main body 25, and an electrode cap 27 having a bottomed cylindrical shape for storing the electrode 21. The lining 26 is integrally provided with an electrode mounting seat 28. The electrode mounting seat 28 is provided with an electrode insertion hole 29 therethrough for inserting the electrode 21.

Figure 2:
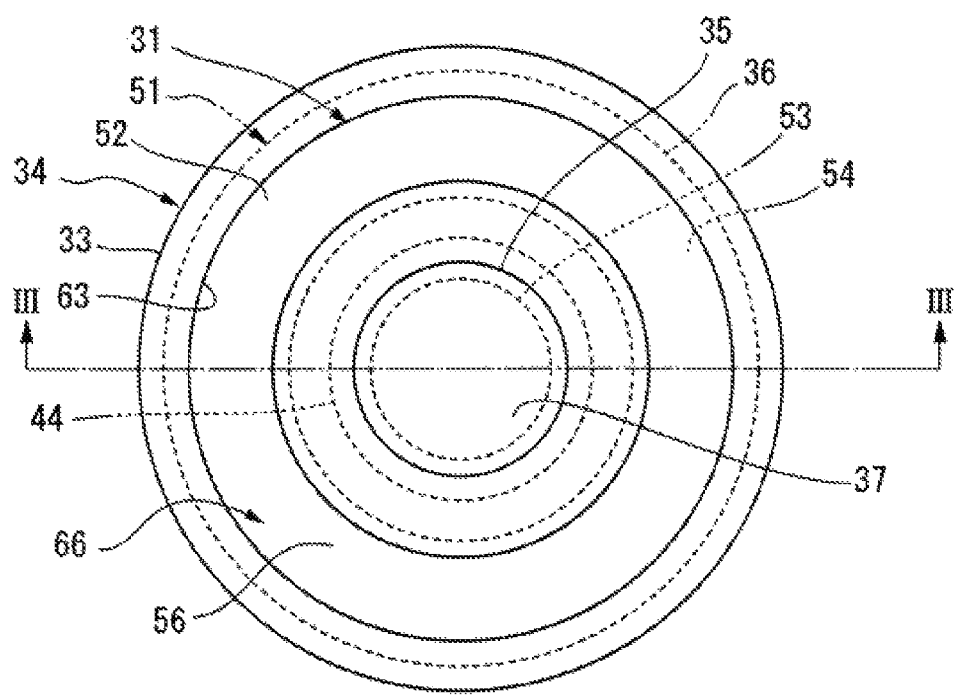
FIG. 2 is a front view of the electropotential detection electrode according to a first embodiment viewed from a pipeline side.
Figure 3:
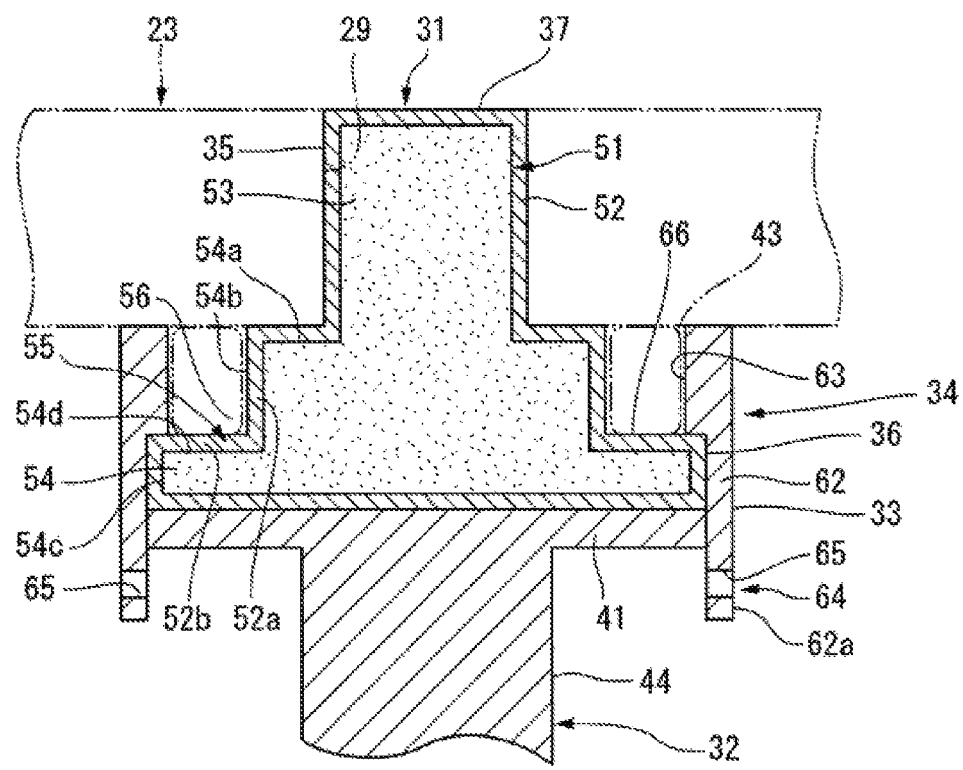
FIG. 3 is a cross-sectional view taken along the line III-III in FIG. 2.

The electrode 21 according to this embodiment comprises a main body portion 31 inserted into the electrode insertion hole 29 of the lining 26, a terminal portion 32 placed on top of the main body portion 31, and a connecting portion 34 formed by using a cylindrical body 33 configured to accommodate the main body portion 31 fitting therein. The main body portion 31, which will be described later in detail, comprises a small diameter portion 35 having a cylindrical shape exposed at one end thereof to the fluid path 24 in the measurement tube 23, and a large diameter portion 36 having a disc shape extending from the other end of the small diameter portion 35 outward in a radial direction as illustrated in FIG. 2 and FIG. 3.

The one end of the main body portion 31 is exposed into the measurement tube 23 and corresponds to a liquid-contact portion 37 that comes into contact with a fluid (not illustrated) flowing in the measurement tube 23. The large diameter portion 36 is formed into a disc shape having a larger outer diameter than the small diameter portion 35, and is urged toward the lining 26 by a spring force of a compression coil spring 42 (see FIG. 1) applied via a disc shaped portion 41 of the terminal portion 32 described later. A gasket 43 is provided between the large diameter portion 36 and the electrode mounting seat 28.

The terminal portion 32 is made of an electrically conductive material, and comprises a disc shaped portion 41 separably placed on top of the large diameter portion 36 of the main body portion 31, and a shaft portion 44 having a cylindrical shape and extending from an axial center portion of the disc shaped portion 41 to an opposite side from the main body portion 31. In this embodiment, the disc shaped portion 41 corresponds to a "contact portion" of the present invention.

The shaft portion 44 is covered with a cylindrical body 45 made of an insulating material and projecting through an end wall 27a of the electrode cap 27 having a bottomed cylindrical shape to outside the electrode cap 27, as illustrated in FIG. 1. The end wall 27a is provided with a through hole 46 formed therethrough and the shaft portion 44 passes through the through hole 46. A projecting side end portion of the shaft portion 44 is formed with a screw hole 47 for connecting a lead wire terminal (not illustrated).

The electrode cap 27 has a function to retain the compression coil spring 42. The electrode cap 27 is screwed into a screw hole 48 of the main body in a state of storing the compression coil spring 42 in the interior thereof. The compression coil spring 42 is compressed in a state in which a shaft of the terminal portion 32 is inserted through a center portion thereof and is stored in the electrode cap 27. One end of the compression coil spring 42 presses the large diameter portion 36 of the main body portion 31 toward the electrode mounting seat 28 via a washer 49 and the disc shaped portion 41 of the terminal portion 32, and the other end pushes the end wall 27a of the electrode cap 27 in a direction opposite from the main body portion 31 via an annular insulating plate 50.

The main body portion 31 of the electrode 21 according to this embodiment comprises a base material 51 made of a ceramic, which is an insulating material, and an electrically conductive material covering the base material 51, as illustrated in FIG. 3. In this embodiment, the electrically conductive material covering the base material 51 is simply referred to as a conductor 52 for the sake of convenience. The disc shaped portion 41 of the terminal portion 32 described above is electrically connected to the conductor 52 by being overlapped with the large diameter portion 36 of the main body portion 31.

Examples of the ceramic material that may be used for the base material 51 include SiC, $Al_2O_3$, $ZrO_2$, $Y_2O_3$, $Si_3N_4$, and SiO. The base material 51 is formed by molding a ceramic raw material into a shape of the main body portion 31 with a die (not illustrated) and is formed by sintering the molded object.

The conductor 52 is made of an electrically conductive material. Examples of the electrically conductive material that may be used for forming the conductor 52 include metal materials having corrosive resistance such as Pt, Ti, Au, Ta, and WC, and also include solder, a synthetic resin material having electric conductivity, and an electrically conductive ink. The conductor 52 according to this embodiment is formed by sintering a metal paste (not illustrated) applied to the base material 51 before sintering together with the base material 51. The metal paste is formed by mixing metal powder and a solvent. By sintering the metal paste, the metal powder is fused and the conductor 52 covering the entire area of an outer surface of the base material 51 is achieved. Since the main body portion 31 is covered with the conductor 52 in this manner, electric conduction in the main body portion 31 is achieved from the one end where the liquid-contact portion 37 is provided to the other end.

Figure 4:
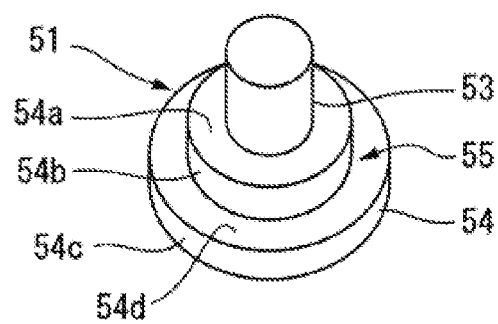
FIG. 4 is a perspective view of a base material according to the first embodiment.

The base material 51 of the main body portion 31 is formed of a cylindrical portion 53 constituting the small diameter portion 35 in cooperation with the conductor 52 described above, and a disc portion 54 constituting the large diameter portion 36 in cooperation with the conductor 52 described above, as illustrated in FIG. 3 and FIG. 4. The cylindrical portion 53 and the disc portion 54 are integrally formed. An outer peripheral portion of the disc portion 54 on one end side of the disc portion 54 (cylindrical portion 53 side) is formed to have a smaller diameter than the other end side. Therefore, the outer peripheral portion of the disc portion 54 is provided with a shoulder portion 55, and the shoulder portion 55 is formed by a first peripheral surface 54b extending in an axial line direction from one end surface 54a in an axial direction of the disc portion 54 and another end surface 54d extending outward from the first peripheral surface 54b in the radial direction and connected to an outermost second peripheral surface 54c of the disc portion 54, as illustrated in FIG. 4.

By sintering the base material 51 formed in this manner and applied with a metal paste on an outer surface thereof, the main body portion 31 comprising the base material 51 covered with the conductor 52 on the outer surface thereof is formed. The main body portion 31 comprises the small diameter portion 35 comprising the cylindrical portion 53 of the base material 51 covered with the conductor 52 and the large diameter portion 36 comprising the disc portion 54 of the base material 51 covered with the conductor 52. The first peripheral surface 54b of the shoulder portion 55 of the disc portion 54 is covered with the conductor 52a, and the other end surface 54d is covered with the conductor 52b, as illustrated in FIG. 3. Therefore, an outer peripheral portion of the large diameter portion 36 is provided with an annular recessed portion 56 by the shoulder portion 55 covered with the conductor 52a and the conductor 52b.

The connecting portion 34 of the electrode 21 according to this embodiment is configured to connect a pulling tool 61 (see FIG. 6) to the main body portion 31 by using a cylindrical body 33. The cylindrical body 33 comprises a cylindrical portion 62 having a cylindrical shape and configured to accommodate the large diameter portion 36 of the main body portion 31 inserted therein, an engaging portion 63 provided at one end portion of the cylindrical portion 62, and a pulling tool attachment 64 provided at the other end of the cylindrical portion 62.

The cylindrical portion 62 is formed into a shape to accommodate the outer peripheral portion, which is largest diameter part of the large diameter portion 36, fitting therein and projects toward the terminal portion 32 from the outer peripheral portion. The disc shaped portion 41 of the terminal portion 32 fits into a projecting portion 62a of the cylindrical portion 62.

The engaging portion 63 is formed at the one end portion of the cylindrical portion 62 on an opposite side from the terminal portion 32, and is formed into a cylindrical shape surrounding the annular recessed portion 56 of the main body portion 31. An inner diameter of the engaging portion 63 is smaller than the outer diameter of the large diameter portion 36. In other words, an inner peripheral portion of the engaging portion 63 is positioned inside an outer peripheral edge of the large diameter portion 36 in the radial direction and is engaged with the large diameter portion 36.

The pulling tool attachment 64 comprises a plurality of through holes 65 formed through the projecting portion 62a described above in the cylindrical portion 62. The through holes 65 are provided at positions that divide the cylindrical portion 62 into a plurality of parts in a circumferential direction.

Figure 5:
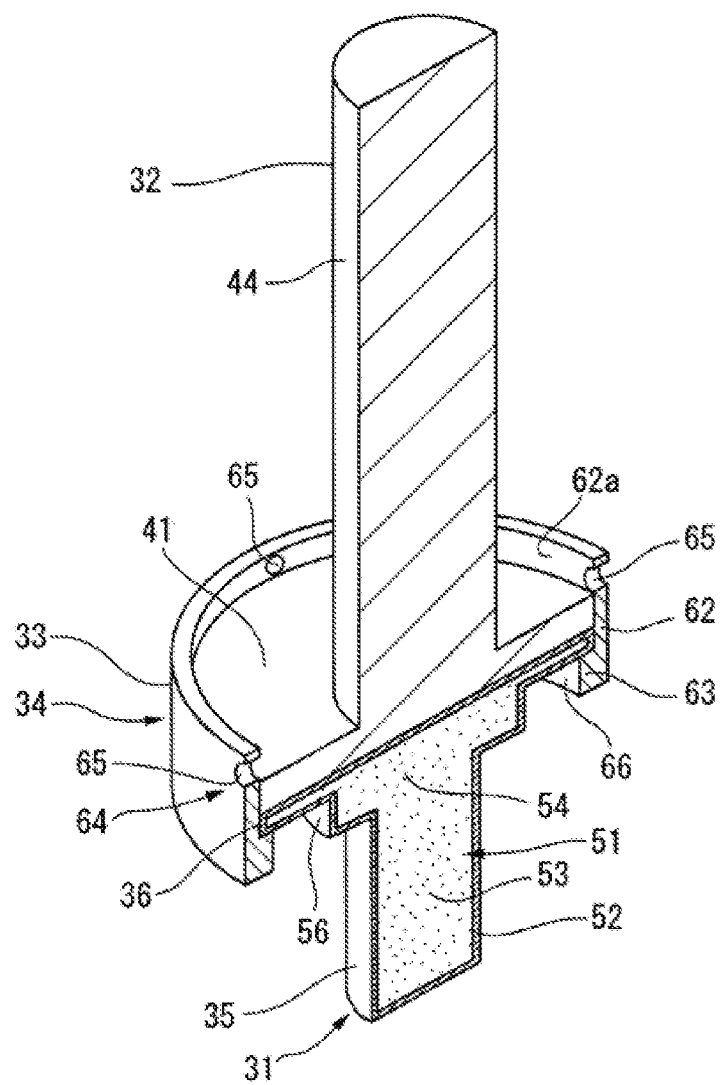
FIG. 5 is a cross-sectional perspective view of the electropotential detection electrode according to the first embodiment.

The electrode 21 configured in this manner is assembled by attaching the terminal portion 32 and the cylindrical body 33 of the connecting portion 34 to the main body portion 31 provided with the conductor 52 on an outer peripheral surface, as illustrated in FIG. 5 In order to attach the terminal portion 32 to the main body portion 31, the cylindrical body 33 is assembled to the main body portion 31 from the one end side (the small diameter portion 35 side) first, and then engaging the engaging portion 63 of the cylindrical body 33 with the large diameter portion 36 of the main body portion 31. Then the disc shaped portion 41 of the terminal portion 32 is fitted to the projecting portion 62a of the cylindrical portion 62 of the cylindrical body 33.

By the cylindrical body 33 attached to the main body portion 31 in this manner, an annular groove 66 opening toward inside the measurement tube 23 is formed between the annular recessed portion 56 provided on the outer peripheral portion of the large diameter portion 36 and the engaging portion 63 of the cylindrical body 33. The gasket 43 described above is accommodated in the annular groove 66.

In order to assemble the electrode 21 to the measurement tube 23 of the electromagnetic flow meter 22, the cylindrical body 45, the washer 49, the compression coil spring 42, and the insulating plate 50 are fitted on the shaft portion 44 of the terminal portion 32 first, and then an obtained assembly is inserted into the screw hole 48 of the measurement tube 23. Next, the small diameter portion 35 of the main body portion 31 is inserted into the electrode insertion hole 29, and in this state, the electrode cap 27 is screwed into the screw hole 48. The electrode cap 27 is screwed inward until the compression coil spring 42 is compressed and the electrode 21 is pressed against the electrode mounting seat 28 at a predetermined load. In this manner, an assembly work of the electrode 21 is completed by completion of screwing of the electrode cap 27 into the main body 25 of the measurement tube 23.

Figure 6:
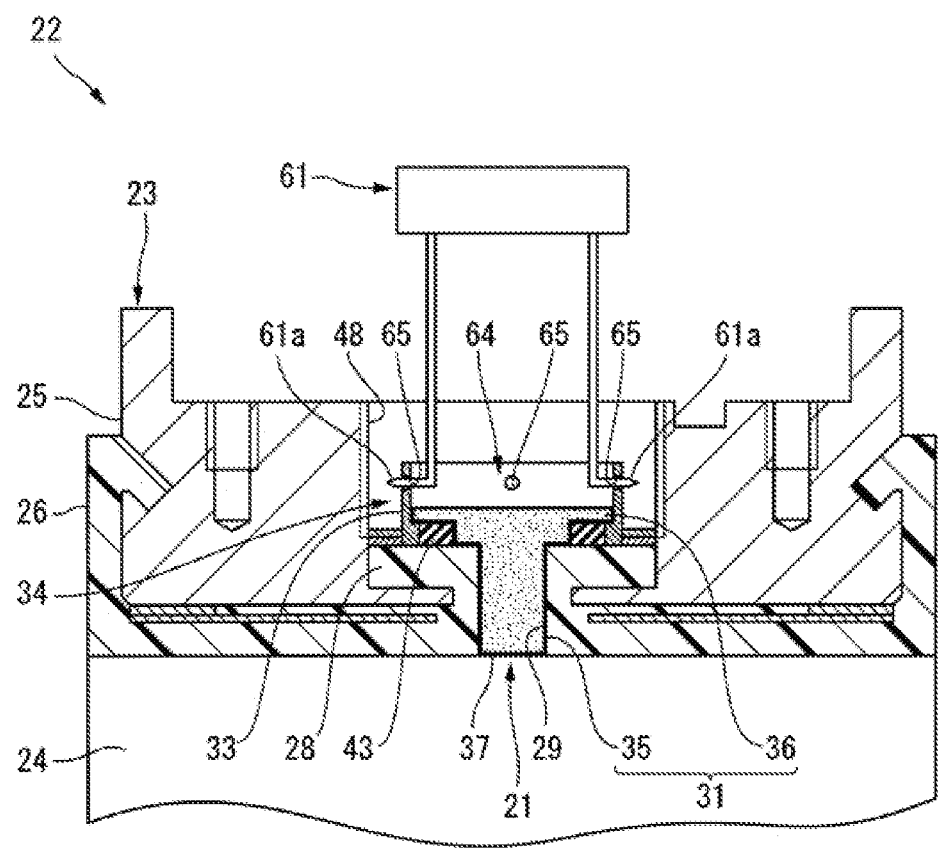
FIG. 6 is a cross-sectional view illustrating a state in which a pulling tool is attached to a main body portion.

The electrode 21 may he subjected to peeling-off of the conductor 52 due to contact with a slurry flowing in the fluid path 24 or adhesion of foreign substances on the liquid-contact portion 37. In such a case, the electrode 21 is replaced with a new one. In order to replace the electrode 21, the electrode cap 27 is removed from the main body 25 of the measurement tube 23 first, and then the terminal portion 32 is removed together with the cylindrical body 45, the washer 49, the compression coil spring 42, and the insulating plate 50. As illustrated in FIG. 6, the pulling tool 61 is inserted into the screw hole 48, and claw strips 61a provided at a distal end portion of the pulling tool 61 is inserted into the pulling tool attachment 64 (through holes 65) of the cylindrical body 33 from inside the cylindrical body 33.

From this state, the pulling tool 61 is pulled in a direction opposite from the main body portion 31 to pull out the small diameter portion 35 of the main body portion 31 from the electrode insertion hole 29, so that the main body portion 31 may be removed from the measurement tube 23.

Therefore, according to this embodiment, an electropotential detection electrode of an electromagnetic flow meter, which eliminates the need for usage of the terminal portion 32 when removing the main body portion 31 from the measurement tube 23, may be provided.

The connecting portion 34 of this embodiment comprises the cylindrical body 33 configured to accommodate the large diameter portion 36 of the main body portion 31 inserted therein, the engaging portion 63 provided on the cylindrical body 33 at an end opposite from the terminal portion 32 and configured to engage the large diameter portion 36, and the pulling tool attachment 64 provided on the cylindrical body 33.

The cylindrical body 33 has a simple structure and, in addition, a structure for attaching the pulling tool 61 to the main body portion 31 is not necessary for implementing this embodiment. Therefore, according to this embodiment, an electropotential detection electrode of an electromagnetic flow meter, which is configured to allow attachment of the pulling tool 61, may be provided at low costs.

The outer peripheral portion of the large diameter portion 36 according to this embodiment is provided with the annular recessed portion 56 that defines the annular groove 66 in cooperation with the cylindrical body 33 of the connecting portion 34. With the gasket 43 accommodated in the annular groove 66, a sealing portion is achieved inside the main body portion 31 with respect to the gasket 43 in the radial direction. Therefore, the cylindrical body 33 is located outside the sealing portion, and thus the cylindrical body 33 does not come into contact with a fluid flowing in the measurement tube 23. Therefore, flexibility in selecting a material for forming the cylindrical body 33 is increased because the need for forming the cylindrical body 33 of a material having a high corrosive resistance is eliminated.

Second Embodiment

Figure 7:
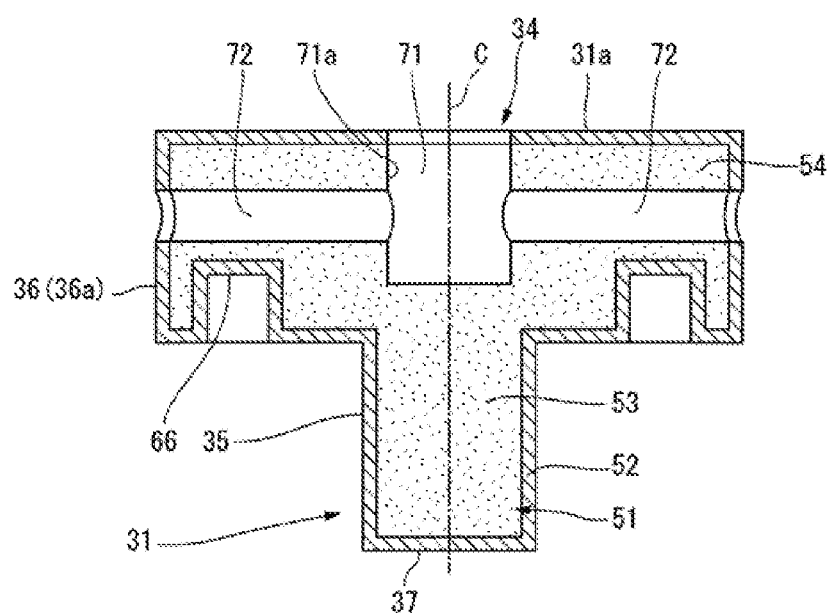
FIG. 7 is a cross-sectional view of the main body portion of the electropotential detection electrode according to a second embodiment.
Figure 8:
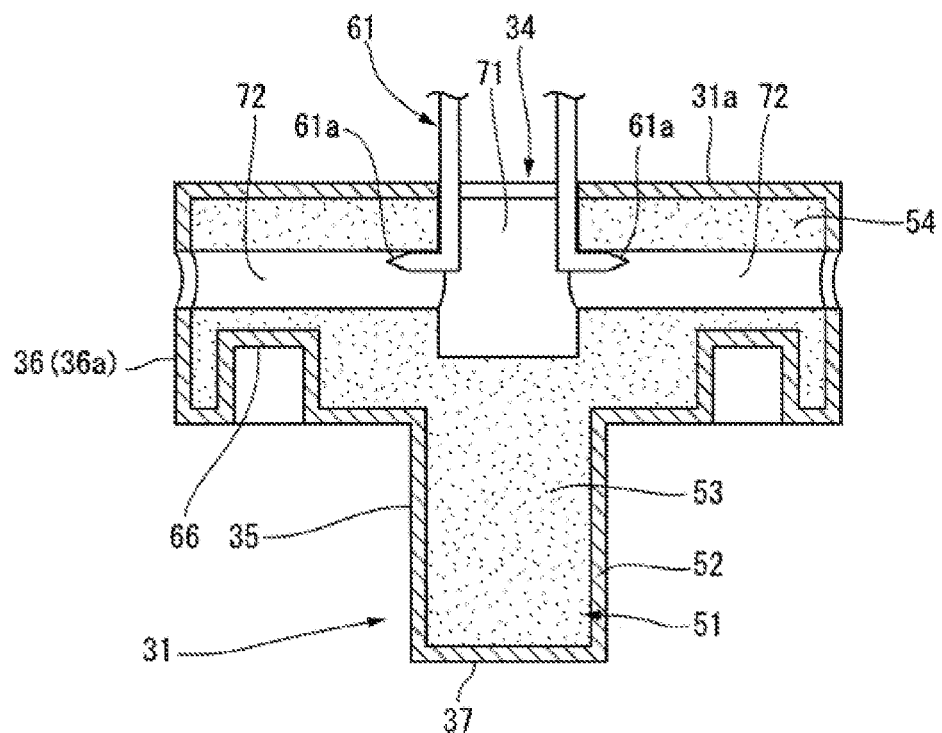
FIG. 8 is a cross-sectional view illustrating a state in which the pulling tool of the main body portion of the electropotential detection electrode according to the second embodiment is attached.
Figure 9:
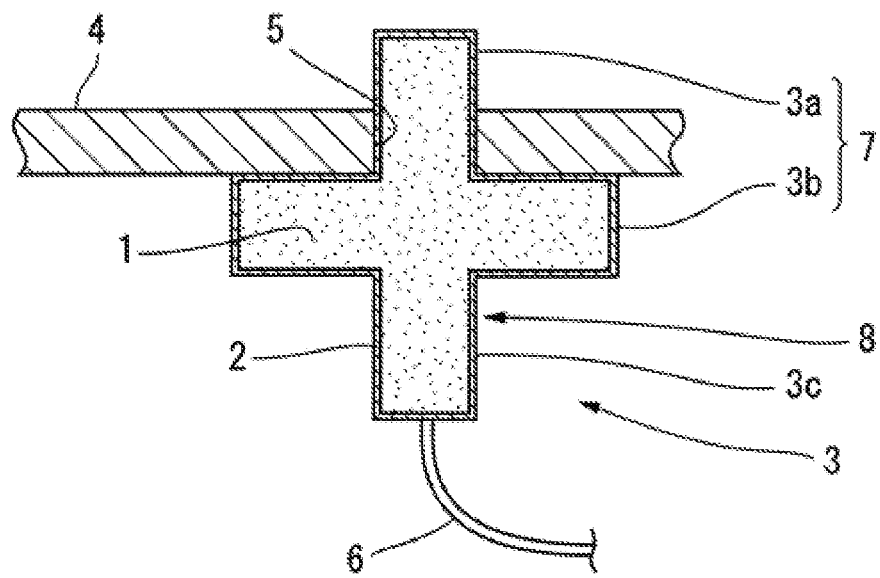
FIG. 9 is a cross-sectional view of an electropotential detection electrode of the related art.
Figure 10:
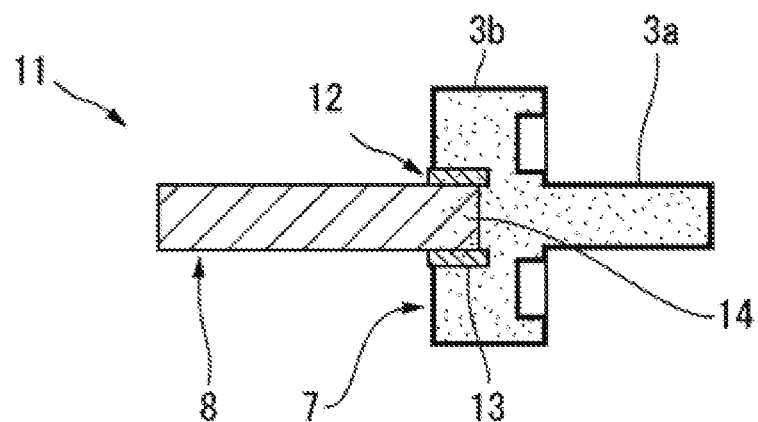
FIG. 10 is a cross-sectional view of the electropotential detection electrode of the related art having an insert screw embedded into a large diameter portion of a main body portion.
Figure 11:
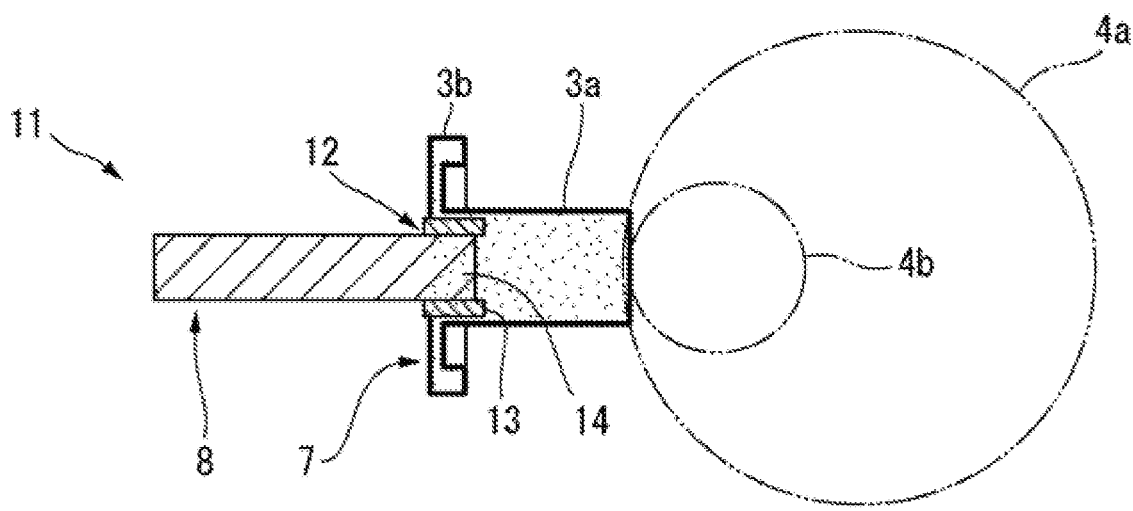
FIG. 11 is a cross-sectional view of the electropotential detection electrode of the related art having an insert screw embedded into a first small diameter portion of the main body portion.

The electropotential detection electrode according to the present invention may be configured as illustrated in FIG. 7 and FIG. 8, in FIG. 7 and FIG. 8, the same or similar members as or to the members described with reference to FIG. 1 to FIG. 6 will be denoted by the same reference signs and detailed description will be omitted as appropriate.

The large diameter portion 36 of the main body portion 31 illustrated in FIG. 7 and FIG. 8 is formed to have a constant outer diameter over the entire range in the axial line direction.

The connecting portion 34 according to this embodiment is provided inside the main body portion 31 and comprises a first hole 71 opening at the other end 31a of the main body portion 31 and a plurality of second holes 72 opening through a hole wall surface 71a of the first hole 71. The main body portion 31 has the liquid-contact portion 37 at the one end thereof. The first hole 71 is provided at an axial center of the large diameter portion 36, and extends from the other end 31a of the main body portion 31 to a position near the small diameter portion 35 in parallel with an axial line C of the large diameter portion 36.

The second holes 72 extend in the radial direction of the large diameter portion 36, each have one end opening into the first hole 71 and the other end opening through an outer peripheral surface 36a of the large diameter portion 36. The second holes 72 are provided at positions that divide the large diameter portion 36 into a plurality of parts in the circumferential direction.

In the electropotential detection electrode having the connecting portion 34 configured in this manner, the main body portion 31 can be removed from the measurement tube 23 by inserting the pulling tool 61 into the first hole 71 and the second holes 72 and hooking onto the main body portion 31 in a state in which the terminal portion is removed from the main body portion 31, and pulling the pulling tool 61, as illustrated in FIG. 8.

Therefore, the configuration of this embodiment eliminates the need for using an additional member except for the main body portion 31 for connecting the pulling tool 61 to the main body portion 31, and thus assembly of the electrode is achieved easily.

In the embodiments described thus far, the example using the main body portion 31 covered with the conductor 52 has been described. However, the present invention is not limited to the configuration of the main body portion 31 described above. For example, the main body portion may be made of a special material to achieve electric conduction between the one end having the liquid-contact portion and the other end.

DESCRIPTION OF REFERENCE NUMERALS AND SIGNS

21: electropotential detection electrode, 22: electromagnetic flow meter, 23: measurement tube, 29: electrode insertion hole, 31: main body portion, 32: terminal portion, 34: connecting portion, 35: small diameter portion, 36: large diameter portion, 37: liquid-contact portion, 41: disc portion (contact portion), 51: base material, 52: conductor, 56: annular recessed portion, 61: pulling tool, 62: cylindrical portion, 63: engaging portion, 64: pulling tool attachment, 66: annular groove, 71: first hole, 72: second hole

The invention claimed is:

1. An electropotential detection electrode of an electromagnetic flow meter, comprising:
    a main body portion provided at one end thereof with a liquid-contact portion exposed into a measurement tube of the electromagnetic flow meter and being electrically conductive from the one end to another end;
    a terminal portion comprising a contact portion that is separably in contact with the other end of the main body portion and electrically connected to the other end of the main body portion via the contact portion coming into contact with the other end, and
    a connecting portion configured to connect a pulling tool to the main body portion.

2. The electropotential detection electrode of an electromagnetic flow meter according to claim 1, wherein
    the main body portion comprises:
        a small diameter portion having a cylindrical shape and serving at one end thereof as the liquid-contact portion by being inserted into an electrode insertion hole of the measurement tube, and
        a large diameter portion having a disc shape, being connected at one end thereof to another end of the small diameter portion, extending outward from the small diameter portion in a radial direction, and coming into contact at another end thereof with the terminal portion, and
    the connecting portion comprises:
        a cylindrical portion configured to accommodate the large diameter portion inserted therein,
        an engaging portion provided on the cylindrical portion at an opposite end from the terminal portion and configured to engage the large diameter portion, and
        a pulling tool attachment provided on the cylindrical portion.

3. The electropotential detection electrode of an electromagnetic flow meter according to claim 2, wherein the engaging portion is formed into a cylindrical shape surrounding the large diameter portion, and
    the large diameter portion is provided with an annular recessed portion on an outer peripheral portion thereof and configured to define an annular groove in cooperation with the engaging portion.

4. The electropotential detection electrode of an electromagnetic flowmeter according to claim 1, wherein the connecting portion comprises:
    a first hole opening at the other end of the main body portion, and
    a second hole opening through a hole wall surface of the first hole.

* * * * *